United States Patent [19]

Covey

[11] Patent Number: 4,919,506

[45] Date of Patent: Apr. 24, 1990

[54] SINGLE MODE OPTICAL FIBER COUPLER

[75] Inventor: Robert L. Covey, Hightstown, N.J.

[73] Assignee: General Electric Company, Schenectady, N.Y.

[21] Appl. No.: 314,854

[22] Filed: Feb. 24, 1989

[51] Int. Cl.$^5$ .............................................. G02B 6/32

[52] U.S. Cl. .............................. 350/96.18; 350/96.15; 350/96.17

[58] Field of Search ............... 350/96.10, 96.15, 96.17, 350/96.18, 96.20; 250/227

[56] References Cited

U.S. PATENT DOCUMENTS

| | | | |
|---|---|---|---|
| 4,078,852 | 3/1978 | Lebduska | 350/96.18 |
| 4,111,522 | 9/1978 | Auracher et al. | 350/96.21 |
| 4,190,316 | 2/1980 | Malsby et al. | 350/96.18 |
| 4,307,934 | 12/1981 | Palmer | 350/96.20 |
| 4,380,365 | 4/1983 | Gross | 350/96.18 |
| 4,475,788 | 10/1984 | Tomassini et al. | 350/96.20 |
| 4,639,077 | 1/1987 | Dobler | 350/96.20 |
| 4,650,285 | 3/1987 | Stevenson | 350/96.20 |
| 4,687,285 | 8/1987 | Hily et al. | 350/96.18 |
| 4,705,351 | 11/1987 | Toda | 350/96.18 |
| 4,726,645 | 2/1988 | Yamashita et al. | 350/96.18 |
| 4,726,648 | 2/1988 | Haberland et al. | 350/96.20 |
| 4,781,431 | 11/1988 | Wesson et al. | 350/96.21 |
| 4,807,958 | 2/1989 | Gunner et al. | 350/96.21 |
| 4,830,453 | 5/1989 | Khoe | 350/96.18 |
| 4,841,344 | 6/1989 | Heinen | 350/96.18 X |
| 4,842,391 | 6/1989 | Kim et al. | 350/96.18 |
| 4,846,544 | 7/1989 | Bortolin et al. | 350/96.18 X |

FOREIGN PATENT DOCUMENTS

| | | | |
|---|---|---|---|
| 0205359 | 12/1986 | European Pat. Off. | 350/96.20 X |
| 53-116166 | 10/1978 | Japan | 350/96.20 X |
| 58-211728 | 9/1983 | Japan | 350/96.20 X |

*Primary Examiner*—William L. Sikes
*Assistant Examiner*—Brian M. Healy
*Attorney, Agent, or Firm*—Paul R. Webb, II; James C. Davis, Jr.

[57] ABSTRACT

A hemispherical lens and a spherical lens couple a laser diode light beam to a single mode 10μ core diameter optical fiber producing coupling efficiencies over 60% without anti-reflection coatings, even with substantial misalignments of the lenses.

14 Claims, 6 Drawing Sheets

HEMISPHERE IS TILTED 10 DEGREES ABOUT FIRST APEX

HEMISPHERE TILTED BY 10 DEGREES AND MOVED, X = +0.050 mm

SINGLE MODE OPTICAL FIBER COUPLER

BACKGROUND OF THE INVENTION

This invention relates to a device for coupling a laser beam from a point source to an optical fiber.

Efficient coupling of a solid state laser beam into a single-mode optical fiber has become an issue of enormous importance. Solid state lasers typically produce infra-red output beams in a one micrometer wave length range with total beam spread angle of about 20–40°. These wide beam spread angles must be reduced to angles typically less than 5° for efficient coupling into single-mode fibers. The use of a single-mode fiber is essential in optical communications to eliminate or at least reduce velocity dispersion in the propogated light signal. If dispersion occurs, the useful bandwidth of the communications signal is greatly restricted, which is highly undesirable.

A variety of systems for efficiently coupling solid state lasers into single-mode fibers have been proposed and tested. Many have proven themselves in practice. However, it is believed that the best coupling coefficient that have been achieved are a maximum of about 50%. Most coupling devices incorporate a single lens, a pair of lenses, or GRIN lenses to focus the laser output beam upon the core of an optical fiber. Magnification from 4X to 7X reduces the lens output aperture angle to practical limits. The lenses typically are small, about 1 mm or less in diameter.

It is difficult to manufacture lenses of this size except in simple forms. Small spheres are generally used in both single and double lens coupler designs. The manufacture of small lenses with concave or aspherical surfaces is difficult and costly. Concave or aspherical lenses are used to correct aberration. Third order spherical aberration is the most important problem to be overcome in achieving higher coupling efficiency particularly when using spherical lenses. All spherical two-lens confocal coupler designs reduce spherical aberration somewhat and provide what is believed to be the best reported efficiencies. However, these efficiencies appear to be relatively low and, thus, there is room for improvement.

SUMMARY OF THE INVENTION

An optical coupling device according to the present invention for coupling a source of light to a single mode light conducting fiber having a first optical axis comprises a hemispherical lens having a planar surface and a spherical surface. The lens has a second optical axis normal to the planar surface. A spherical lens has a given optical axis. Means are adapted for positioning the planar surface of the hemispherical lens facing the source of light and the spherical lens spaced between the spherical surface of the hemispherical lens and the optical fiber. The first, second and given axes are substantially aligned with the lenses being so dimensioned and spaced relative to the source and fiber so as to focus light from the source for reception by the fiber.

In the drawing:

DETAILED DESCRIPTION OF THE INVENTION

Figure 1:
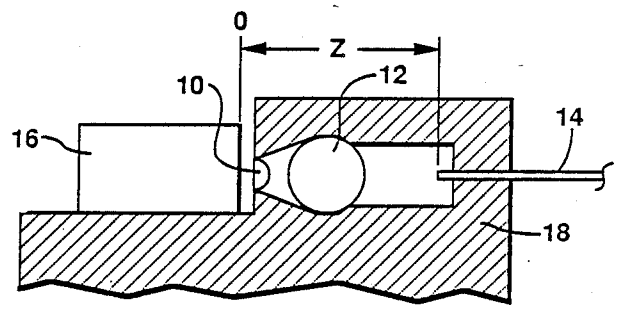
FIG. 1 is a diagramatic sectional view of an optical coupling device according to one embodiment of the present invention.

In FIG. 1, a two lens design is illustrated comprising preferably sapphire hemisphere and spherical lenses 10 and 12, respectively, which further reduce spherical aberrations and, according to geometrical optics, provide a significant improvement in coupling efficiency for a single mode optical fiber 14 from a light emitting device 16 such as a laser diode. The lenses 10 and 12, the fiber 14 and the diode 16 are supported by a coupling structure 18. The design of the structure 18 is not significant to the present invention and any state of the art support structure for supporting and aligning the lenses 10 and 12, fiber 14 and diode 16 as disclosed herein may be used.

In FIG. **12*a*, a ray 120 from a point source 122 of light is incident upon the surface 124 of a spherical lens 121 at angle $\gamma$. The light is then refracted by the lens 121 into ray 126 which is refracted into ray 128 at surface 124*a* also at angle $\gamma$. The lens 124 has an optical axis 130. While only one ray 120 is illustrated, it is to be understood that this ray comprises a band of rays within a cone of rays represented by ray 120, each ray incident on the surface 124**.

The angle $\gamma$ becomes more acute (smaller) when the outermost ray 120 of the core of rays impinges upon the surface 124 at a region where the ray closely approaches the tangent to surface 124. Obviously, a tangential ray will not refract into the sphere but the next adjacent rays should. However, the angle of incidence of those next adjacent rays is relatively small. The present inventor recognizes a problem caused by the relatively acute angle of the peripheral rays of the conical envelope of rays from the source 122. Those rays tend to distort due to commonly occurring aberrations in the spherical lens. Such aberrations refract these rays in a direction away from parallel alignment with axis 130. In this case, the rays tend to be refracted in a direction so as not to be focused by the lens at a common focal point. These aberrations caused refraction distortions tend to decrease coupling efficiency of the light from source 122 to the focal point 132.

For example, assume ray 134 is incident on surface 124 close to the point of tangency. Ray 134 may be refracted as shown by rays 136 and 138 causing loss of the energy of the ray 134 at focal point 132. Therefore, a relatively wide angle beam produced by source 122 tends to have a significant portion of its rays distorted and lost using a spherical lens. Two spherical lens systems have been used in an attempt to increase the coupling efficiency somewhat. However, these efficiencies are not that signficantly improved as discussed in the introductory portion.

In FIG. **12*b*, a hemispherical lens 151 has a planar surface 150 and a spherical surface 152**. A point source 154 of light has a ray 156 which is incident on surface 150 at angle $\alpha$. The angle $\alpha$of incidence of ray 156 on surface 150 is equal to the angle $\alpha_1$ of ray 158 refracted from the lens spherical surface 152. The ray 160 that propagates through the hemisphere is bent somewhat due to the difference of the index of fraction of the material compared to the ambient. Ray 160 tends to diverge relative to the point source 154 as does the ray 158. Due to the refraction angle $\alpha_1$, the relative angle $\beta$ of ray 158 to a line parallel to the optical axis 162 of the lens 151 is relatively small, for example, less than 10° and generally about 5°. The envelope of rays from the source 154 incident on the surface 150 exhibit refracted diverging angles corresponding to angle $\beta$. As angle $\alpha$ increases, the value of $\beta$ also increases.

One aspect of the spherical and hemispherical lenses is that they should be made of material having as high an index refraction as possible to enhance their coupling efficiency. Normally, the envelope from a light emitting device such as device 16, FIG. 1, has an emitting angular spread in a range of about ± 24° which is relatively wide. By making the index of refraction relatively high for the lens material, a relatively larger lens may be used as compared to materials made of low indices of refraction for a given point source of light and a given envelope angular spread. For example, glass has a general index of refraction n of 1.5 whereas sapphire has an index of refraction n of 1.7. Thus, glass for a given implementation for a given laser diode would require a smaller lens to achieve the same coupling efficiency as a sapphire lens. However, smaller lenses tend to exhibit increased aberrations and distortion. Spherical and hemispherical lenses are desirable because the rays that pass through the lens medium are refracted by the media into a somewhat parallel path forming a substantially collimated beam. These lenses are also less costly to fabricate than aspherical or concave lenses. The rays when refracted into the ambient medium from the spherical lens then converge onto a focal point.

In employing lasers emitting light in the infra-red region, for example, 1.1 micron wavelength, it is common practice to employ optical fibers of 10 micron diameter core which propogates light only in a single-mode.

Figure 12A:
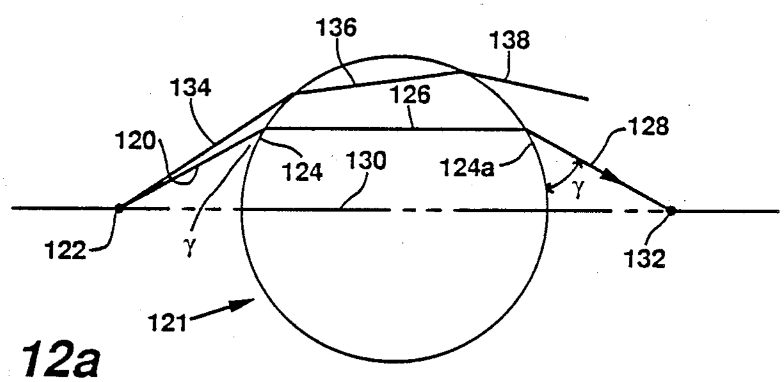

Larger diameter cores, for example, 20 micron and larger propogate light in many modes which tend to distort light at relatively high data transmission rates, for example. A 10 micron diameter receiving optical fiber, because of its relatively small size, requires a relatively sharp focus from the lens coupling system. Due to the spherical aberration in commonly used spherical lenses, the coupling efficiency within the range mentioned above is lower than desirable. The aberrations in a spherical lens create a paraxial image in which the various rays from the spherical lens cross the optical axis at spaced distances along the optical axis creating spaced apparent focal points. While it is ideal that all rays from the spherical lens be focused on a common focal point especially in view of the small 10 micron diameter of an optical fiber, the paraxial image results in loss of further coupling of the rays and reduced coupling efficiency. As mentioned above in connection with the spherical lens disclosed in FIG. 12*a*, the relatively acute angles of incidence of the peripheral rays of the incident beam cause an increased spacing of the extremes of the paraxial image contributing to further reduction in coupling efficiency.

Figure 12B:
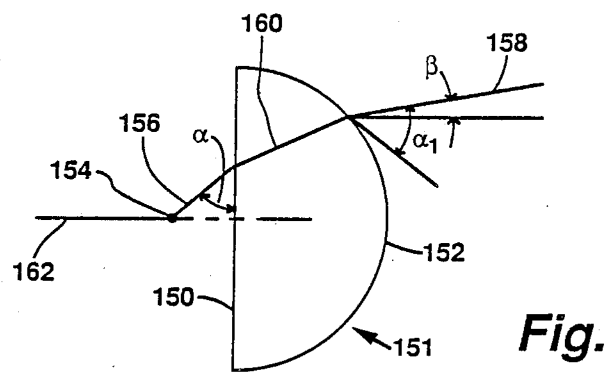

As illustrated in FIG. 12*b* the rays tend to fan out upon exiting the hemispherical lens body. Normally such fan out would be considered undesirable in an optical coupling system. The lenses according to conventional wisdom should maintain the rays as close to the optical axis as possible. It is assumed this closeness enhances convergence of the rays at the focal point of the receiving optical fiber. Therefore, according to conventional wisdom, fan out of the rays such as ray 158, FIG. 12*b*, is contrary to the requirements of an optical coupling system for achieving the desired focusing. According to the present invention, however, the combination of a hemispherical lens with a spherical lens aligned coaxially on a common optical axis provides significant enhancement of the coupling efficiency of a point source of light, for example, a semiconductor laser diode to a single mode optical fiber.

It can be shown that a computer lens design program incorporating state of the art geometrical optical equations can be used to optimize the lens dimensions and spacings. Such a program includes geometrical ray tracing calculations for a Gaussian laser with a full (1/e) power angle of 40°. These traces indicate an improvement in coupling efficiency from about 57% without considering deffraction effects, for the best spherical confocal design to about 67% incorporating the optical coupling device of the present invention.

The optical transmission coefficient i.e., reflection loss, for two sapphire lenses is about 27% wherein the loss at each surface is about 6.9%. Thus, nearly all light transmitted enters a single mode fiber core. A single layer anti-reflection (AR) coating on the sapphire surfaces are believed to result in a 94% coupling efficiency in the geometrical optics approximation employing the computer program mentioned above. In contrast, the best spherical confocal design is of sapphire and glass materials. Such a combination when uncoated can have a maximum transmission of about 78% due to reflection losses and not considering either aberration or defraction losses. AR coatings on both lenses can improve the coupling efficiency to a range of 57%-79% employing two spherical lenses.

These percentages do not take into account diffraction effects in the lenses. The diffraction effects L may further reduce efficiency by about 5-10% incorporating two spherical lenses of prior art coupling systems or a hemispherical lens and spherical lens of the present invention. However, a hemispherical lens combined with a spherical lens improves efficiency when diffraction is considered due to reduction in wave front distortion.

Figure 2:
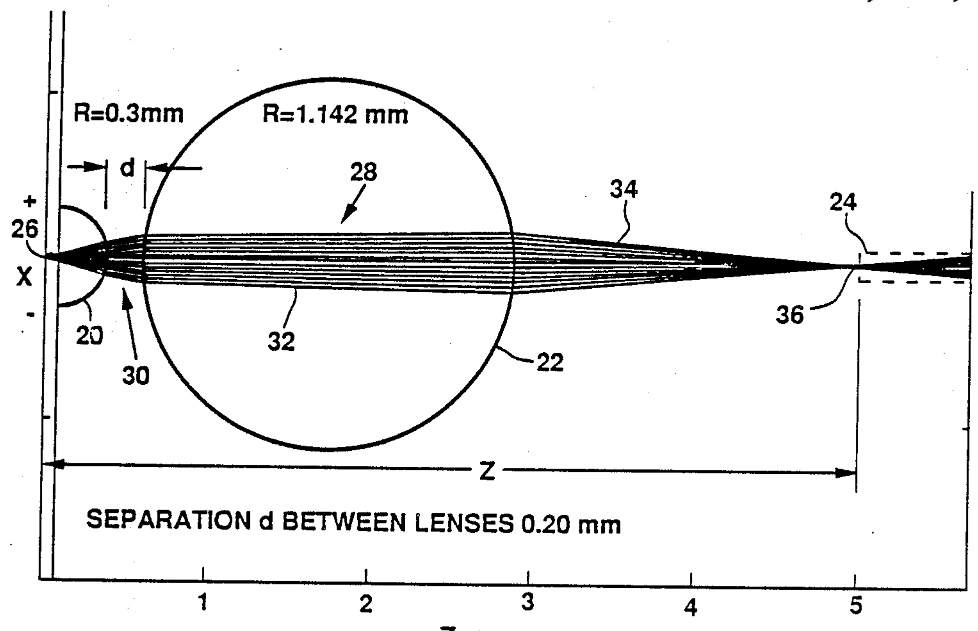
FIGS. 2, 4, 6, 8 and 10 are diagrams illustrating different lens configurations employing the embodiment of a coupling device of FIG. 1 and illustrating computer generated ray traces for different conditions of the lenses.

FIG. 2, by way of example, illustrates a hemispherical lens 20 of radius 0.3 mm and a spherical lens 22 of radius 1.142 mm both without anti-reflection coatings. The spacing d between the two spherical surfaces of the two lenses is 0.20 mm. The optical axes of the lenses 20 and 22 are coaxial. The planar surface of lens 20 is perpendicular to the coaxial aligned axis. A single-mode optical fiber 24 having a 10 micron diameter core is spaced a distance Z from a point source 26 of light. Rays 28 between source 26 and focal point 36 correspond to rays produced by calculations using metric optics employing a computer program generally discussed above. The rays are plotted on a computer operated plotter forming a ray trace according to standard geometric optics calculations. The rays are plotted in 4 degree steps in the range of ±24 degrees for a total of 12 ray plots. As shown, the rays 28 diverge somewhat in region 30.

However, the beam 32 within the spherical lens 22 closely approximates a collimated beam even though some divergence occurs. The beam 34 refracted by the lens 22 converges at focal-point 36 for reception by the fiber 24.

Figure 3:
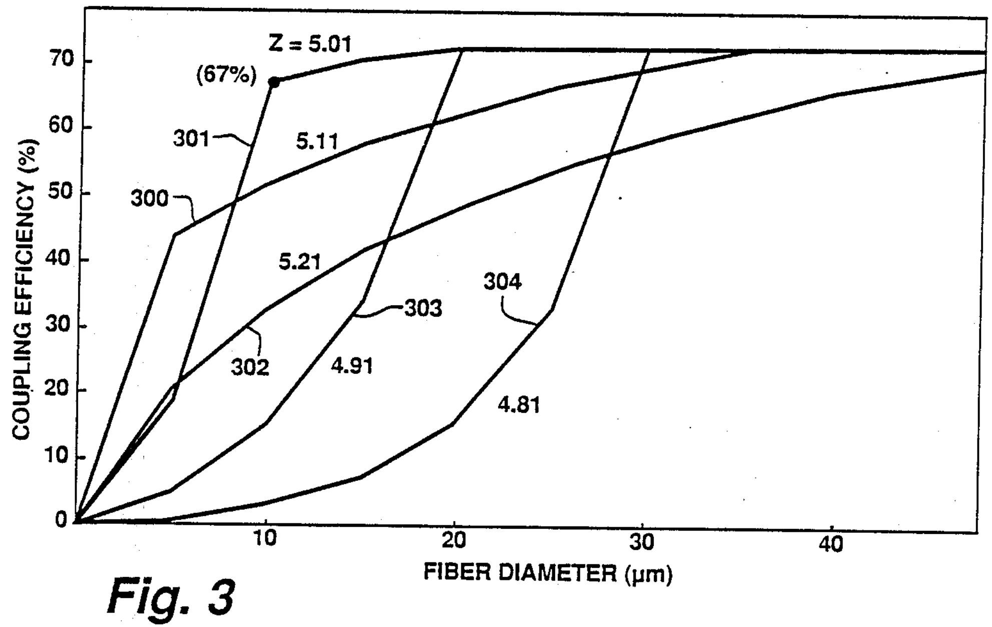
FIGS. 3, 5, 7, 9 and 11 are charts illustrating and corresponding respectively to the FIGS. 2, 4, 6, 8 and 10 embodiments for showing the relative coupling efficiency relative to the fiber diameter of the received optical receiving optical fiber without anti-reflection coatings on the coupling lenses; and FIGS. **12*a* and 12*b*** are diagrams useful for explaining some of the principles of the present invention.

In FIG. 3, a plot is shown of the coupling efficiencies of the lenses of FIG. 2 to different fiber diameters. The lens separation is 0.20 mm with the laser beam spread angle of ±24° and laser tilt 0°. Laser tilt refers to the angular alignment of the laser emitted beam to the optical axis. For example, curve 301 is a plot of the coupling efficiency. The coupling efficiency is plotted with respect to the fiber diameter of a single mode optical fiber as a receiver medium. The numbers adjacent each curve show the Z spacing of the fiber from the point source of light. For the widely used and desired 10 micrometer diameter fiber optic which is ideally suited for infra-red laser diodes of the wavelength mentioned above, the coupling efficiency employing the two lens system of FIG. 2 dimensioned as shown employing sapphire lenses is 67% at the optimum Z spacing of 5.01 mm for lenses dimensioned as shown in the figure. This is to be compared to the prior art coupling efficiency of a two spherical lens system of about 57%.

While the coupling efficiency goes up somewhat for a 20 micron diameter fiber, the 20 micron diameter fiber is not as suitable as a 10 micron diameter fiber due to multiple mode transmission. As shown, the optimum distance Z employing a 10 micron diameter fiber for reception of the light from the lens coupling system, is 5.01 mm, curve 301. Curve 300 illustrates the coupling efficiency when the fiber optic receiver is placed at a Z distance 5.11 mm from the light source. For the 10 micron diameter fiber, the efficiency is somewhat less than 50%. Curves 302, 303 and 304 show other plots of coupling efficiencies for the different Z spacings. The coupling efficiencies for a 10 micron diameter fiber optic decreases significantly. However, as the fiber diameter increases in size, the coupling efficiency increases for these other fibers due to the greater convergence of the rays at the focal point. For example, curve 304 represents a plot of coupling efficiency with the fiber placed at 4.81 mm from the point source wherein a fiber of at least a 30 micron diameter has maximum coupling efficiency.

Figure 4:
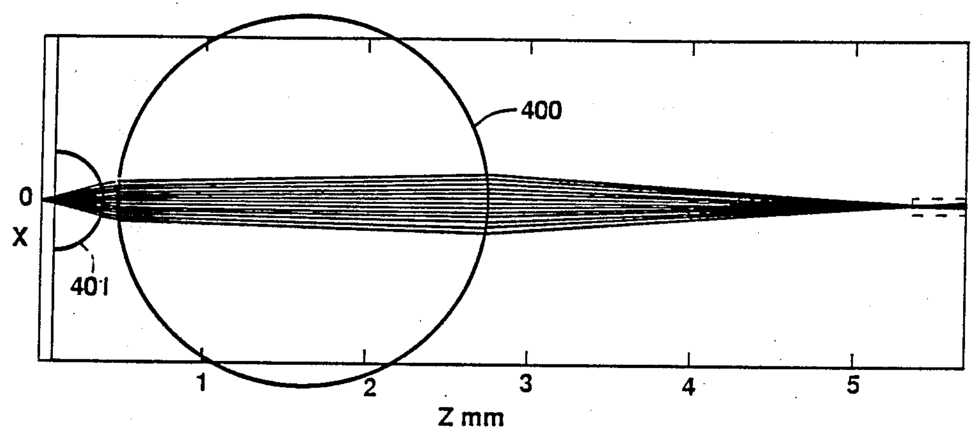
Figure 5:
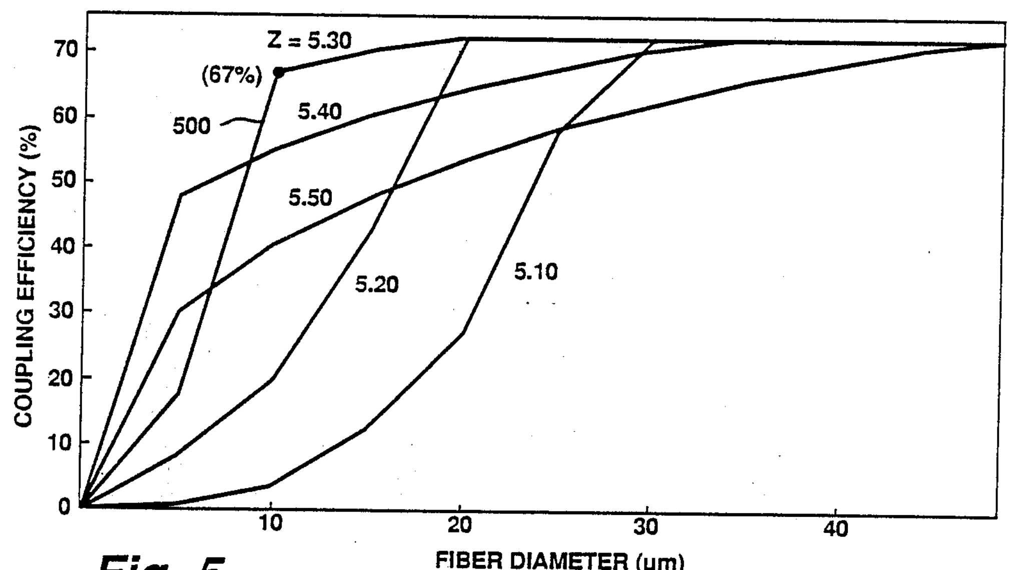

FIG. 4 illustrates a second example somewhat similar to the arrangement of FIG. 2 except that the spherical lens 400 is spaced closer to the hemispherical lens 401 at a distance of about 0.050 mm as compared to the 0.20 mm in the embodiment of FIG. 2. The plot of FIG. 5 using the same program used to create the plot of FIG. 3 shows that for a Z distance of 5.3mm (optimum Z distance for these conditions),curve 500, the couplinq efficiency illustrates that the relative spacing between the spherical surfaces of the spherical lens and the hemispherical lens is not critical.

Figure 6:
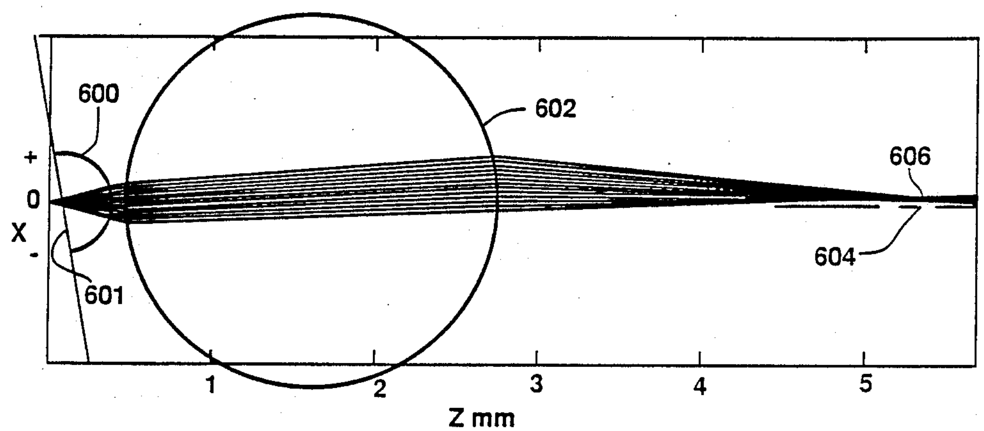

FIG. 6 illustrates the hemispherical lens 600 planar surface 601 tilted relative to the optical axis of the two lens. The tilt is shown at a 10° tilt angle about the center of the flat surface of the hemispherical lens 600 which is aligned on the optical axis 664 of spherical lens 602. However, he focal point 606 is displaced positively in the x direction 0.0764 mm. This displacement is taken into account by adjusting the position of the receiver fiber accordingly.

Figure 7:
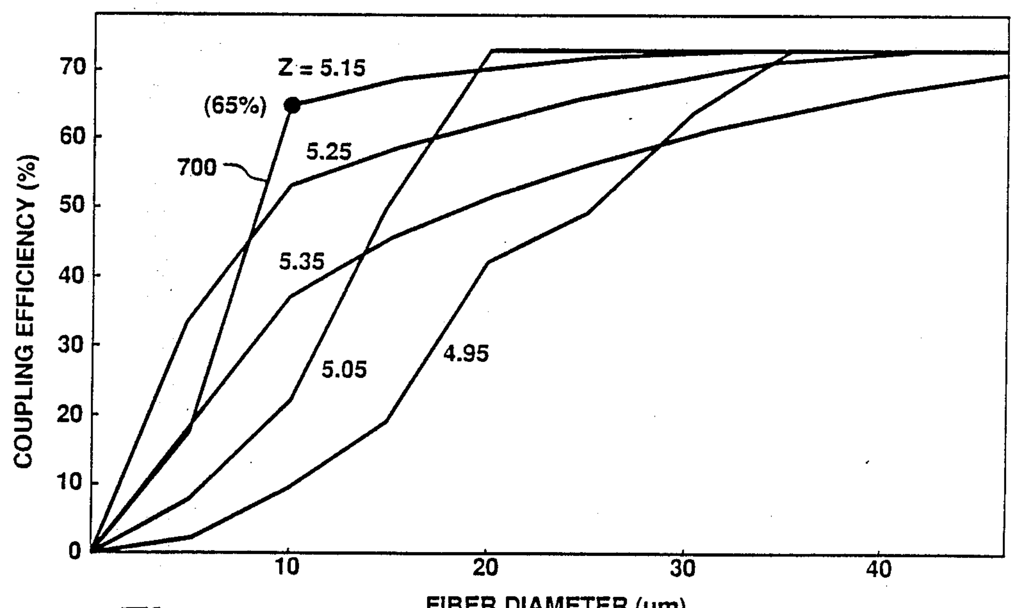

FIG. 7 illustrates that for a Z distance of 5.15 mm and an optical fiber of 10 microns, there is a coupling efficiency of 65%. Thus, tilting the hemispherical lens relative to the spherical lens does not result in a significant reduction in the coupling efficiency of the embodiments of FIGS. 2 and 4 notwithstanding some repositioning of the fiber from the optical axis 604. Curve 700 represents the coupling efficiency for the optical fiber receiver spaced a Z distance of 5.15 mm from the point source of light. Different spacings are shown for the remaining curves of FIG. 7, which for a 10 micron diameter fiber result in reduced coupling efficiencies.

Figure 8:
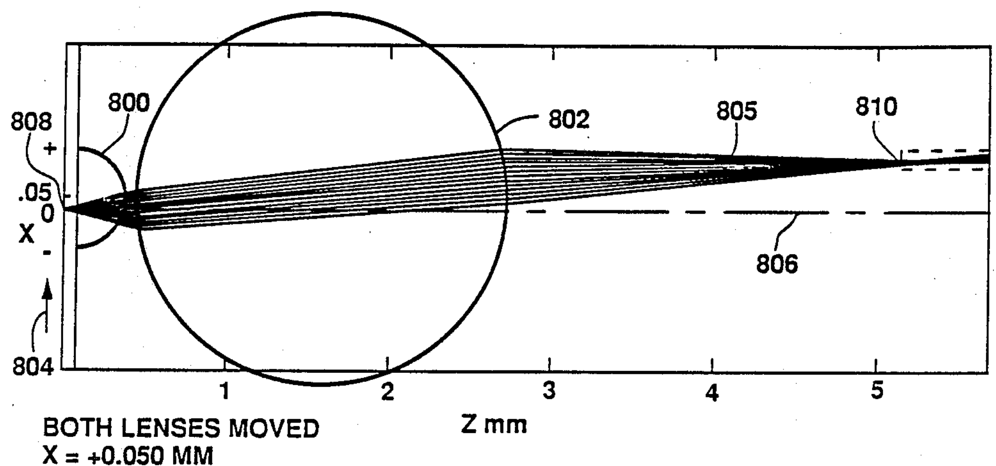

FIG. 8 illustrates a third example in which hemispherical lens 800 and spherical lens 802 are both displaced in the x direction 804 relative to the point source 808. The x displacement has a value of +0.050 mm. The optical axis of the projected beam 805 is tilted toward the top of the drawing figure. The focal point 810 is spaced a distance x of 0.33 mm from the aligned optical axis 806.

Figure 9:
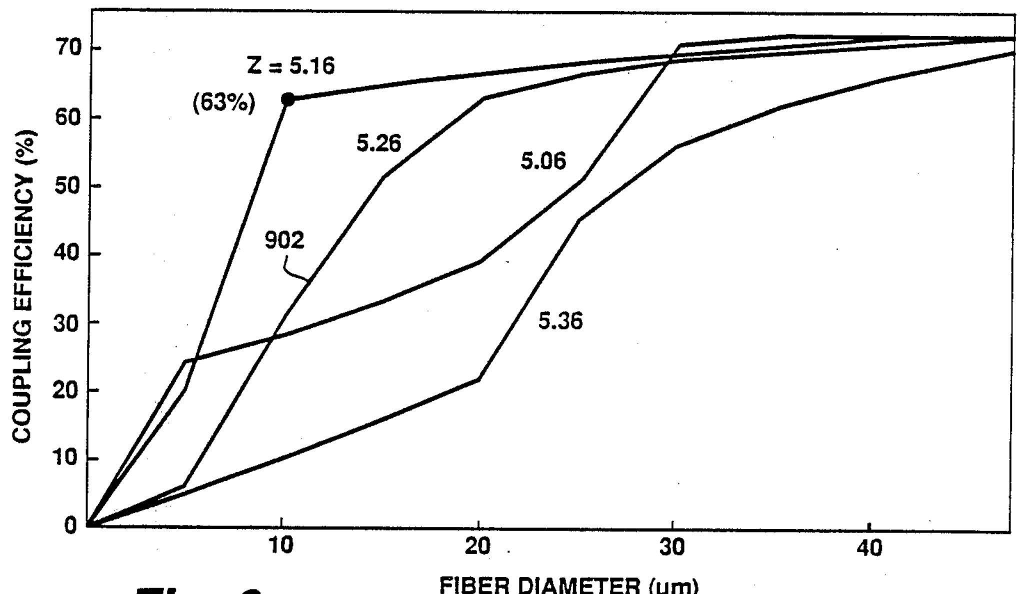

The plot of FIG. 9, corresponding to the FIG. 8 configuration, shows that the optimum Z distance of the focal point 810 of lens combination 800 and 802 from the point source 808 is 5.16 mm. At this location there is a coupling efficiency of 63% for a 10 micron diameter fiber. In this case, the fiber is displaced an x distance from axis 806 a value of 0.33 mm. The remaining curves of FIG. 9 show significantly decreased coupling efficiencies for this size optical receiver fiber. Curve 902, for example, illustrates that a 10 micron fiber has a coupling efficiency of approximately 35% with the fiber spaced at a distance of 5.26 mm from the point source. As shown, a 20 micron fiber has a coupling efficiency above 60% at a distance of 5.26 mm and a 30 micron diameter fiber produces a coupling efficiency above 60% at a spacing of 5.06 mm.

Figure 10:
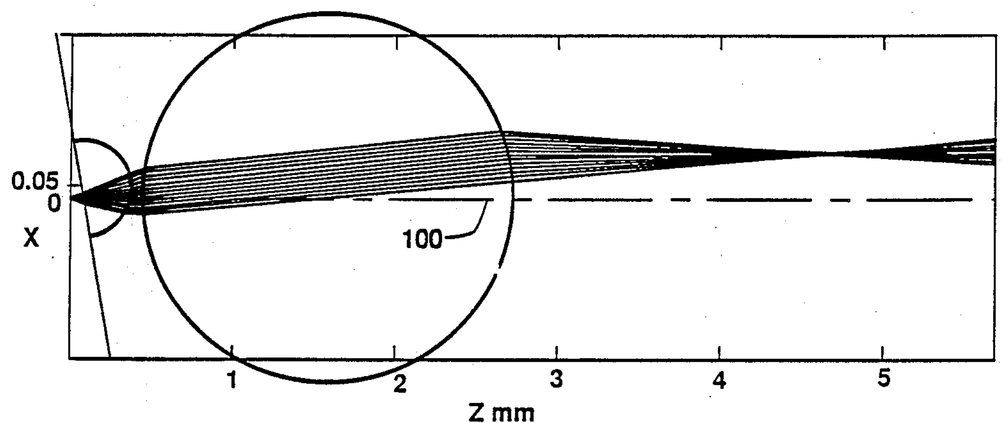
Figure 11:
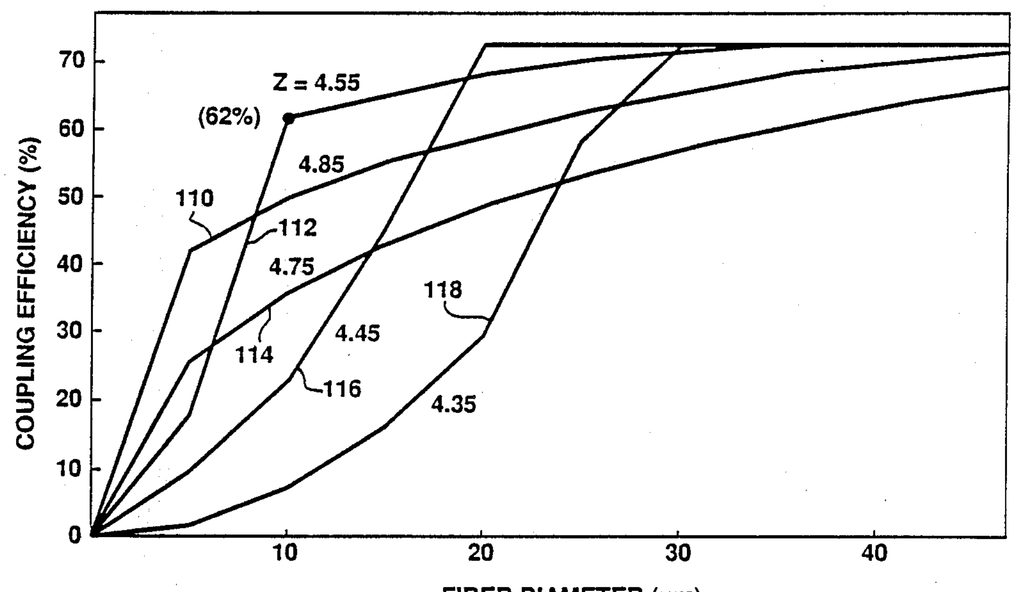

FIG. 10 is a fourth example and illustrates the hemispherical lens tilted 10% and displaced a distance x of 0.050 mm relative to the optical axis 100. FIG. 11 shows a plot for the FIG. 10 configuration in which curve 110, representing an optimal fiber spacing of 4.55 mm from the point source, illustrates a 62% coupling efficiency when the fiber diameter is 10 microns. Again, as true of the other figures showing the plots for different physical orientations of the two lenses, the coupling efficiency increases as the diameter of the fiber increases and with different spacings of the fiber to the point source to optimize the coupling efficiency. What FIGS. 2–11 show is that there is a wide tolerance of misalignment of the two lenses without significant reduction in the coupling efficiency. In fact, in each of the above noted cases for the given lens dimensions which are all constant at a radius of 1.142 mm for the spherical lens and 0.3 mm for the hemispherical lens, the coupling efficiency, while reduced, is optimized regardless of physical misalignment of the lenses.

It is relatively difficult to completely cancel transverse spherical aberration using only spheres and hemispheres. However, using a third order calculation, Table I illustrates optimum performance for the hemispherical-spherical lense combination.

TABLE I

| | |
|---|---|
| Object distance to first apex-<br>First element | 0.090 mm |
| Sapphire hemisphere (N = 1.769)<br>Flat side facing object<br>Radius | 0.30 mm |
| Apex speration to second element<br>Second element | 0.20 mm |
| Sapphire sphere (N = 1.769)<br>Radius | 1.142 mm |

TABLE I-continued

| | |
|---|---|
| Last apex distance to image | 2.136 mm |
| Paraxial magnification | −4.89 X |
| Paraxial total conjugate distance | 5.191 mm |

In Table I, the first row of the right hand side represents the distance from the fiber to the flat face of the hemispherical lens. The distance for best energy coupling to a 10 micrometer diameter fiber core is not the same distance as that for a paraxial image. The paraxial image lies 0.181 mm further away from the object. Third order lateral spherical aberration is 14.7 micrometers at 20°. This can be compared to 22.2 micrometers for a two spherical lens confocal design. There is a significant reduction in spherical aberration at the third order level employing the lenses of FIG. 1.

The principles involved in the present invention split the power between two lenses (virtual intermediate image formed by the first lens) and using relatively high index materials to maintain the rays as close as possible to the optical axis. These two principles apparently appear to be in conflict due to the divergence of the rays from the hemispherical lens as discussed above. The resulting optimization of the present lens configuration employing a spherical lens and a hemispherical lens, their radii and their spacing in comparison to the diverging angle of the point source of light represents a compromise of the different factors involved. Spherical aberration scales directly with physical size in paraxial magnification. Therfore, the smallest possible size should be chosen for the lenses and spacings, and the magnification kept as low as possible without degrading single mode coupling.

Generally, employing a hemispherical lens and a spherical lens as disclosed herein represents a configuration which is relatively insensitive to spacing between the lenses and also provides a relatively large tolerance coupling efficiency to the various misalignments. While the dimensions given herein are based on a given implementation, it is to be understood that the parameters of the lenses is intended to be within the scope of the appended claims and that the specific values given in the figures are by way of example and not by way of limitation.

What is claimed is:

1. An optical coupling device for coupling a substantially point source of light to a single mode light conducting fiber having a first optical axis, said device comprising:

a hemispherical lens having a planar surface and a spherical surface, said lens having a second optical axis normal to said planar surface;

a spherical lens having a given optical axis; and means adapted for positioning said planar surface facing said source of light and said spherical lens spaced between the spherical surface of said hemispherical lens and said fiber, said first, second and given axes being substantially aligned with said point source, said lenses being so dimensioned and spaced relative to said source and fiber so as to focus light from said source for reception by said fiber, said hemispherical lens being so dimensioned and so positioned relative to said source of light such that the angle of incidence of light onto said hemispherical lens and the angle of the light refracted from the hemispherical lens are substantially the same.

2. The device of claim 1 wherein said hemispherical lens is so dimensioned to form said point source of light into a diverging beam of light, said spherical lens being dimensioned relative to said hemispherical lens so as to reconverge said diverging beam to a focal region spaced from said spherical lens on about said first axis.

3. The device of claim 1 further including an antirefection coating on said lenses.

4. The device of claim 1 wherein said lenses each comprise sapphire.

5. The device of claim 1 wherein said fiber has about 10 μm diameter core, said hemispherical lens having a radius of about 0.3 mm and said spherical lens having a radius of about 1.140 mm.

6. The device of claim 5 wherein the separation between said lenses is in the range of about 0.050 to 0.50 mm.

7. The device of claim 5 further including means for locating said fiber spaced from said spherical lens at the focus of said spherical lens.

8. The device of claim 7 wherein the spacing of said point source to said fiber is about 4.5 to 5.5 mm.

9. An optical coupling device comprising:

a housing;

means for securing a single mode optical fiber to said housing, said fiber having a first optical axis;

means for securing a semiconductor laser device to said housing, said laser device emitting light on a second optical axis aligned substantially with said first axis;

a hemispherical lens secured to the housing, said lens having a planar surface facing said device and an optical axis normal to the planar surface aligned with said laser device optical axis; and a spherical lens secured by said housing between the hemispherical lens and the fiber substantially symmetrically disposed relative to said fiber and hemispherical lens axes, the spacing of said hemispherical lens from the laser device and to the spherical lens, and the spacing of the spherical lens to the fiber and the respective radii of the lenses being dimensions so as to substantially focus the light from said lens device at a location for reception by said fiber, said hemispherical lens being so dimensioned and so positioned relative to said source of light such that the angle of incidence light onto said hemispherical lens and the angle of the light refracted from the hemispherical lens are substantially the same.

10. The coupling device of claim 9 wherein said spherical lens has a radius of about three to four times the radius of said hemispherical lens.

11. The coupling device of claim 9 wherein the hemispherical lens is dimensioned and so spaced from the spherical lens such that the coupling efficiency of the light from said laser device to said fiber is greater than about 60% without the use of an anti-reflection coating on said lenses.

12. An optical coupling device for coupling a substantially point source of light to a single mode light conducting fiber having a first optical axis, said device comprising:

a hemispherical lens having a planar surface and a spherical surface, said lens having a second optical axis normal to said planar surface;

a spherical lens having a given optical axis; and means adapted for positioning said planar surface facing said source of light and said spherical lens spaced between the spherical surface of said hemispherical lens and said fiber, said first, second and given axes being substantially aligned with said point source, said lens being so dimensioned and spaced relative to said source and fiber so as to focus light from said source for reception by said fiber, said fiber having about a 10 μm diameter core, said hemispherical lens having a radius of about 0.3 mm and said spherical lens having a radius of about 1.140 mm.

13. An optical coupling device comprising:

a housing;

means for securing a single mode optical fiber to said housing, said fiber having a first optical axis;

means for securing a semiconductor laser device to said housing, said laser device emitting light on a second optical axis aligned substantially with said first axis;

a hemispherical lens secured to the housing, said lens having a planar surface facing said device and an optical axis normal to the planar surface aligned with said laser device optical axis; and a spherical lens secured by said housing between the hemispherical lens and the fiber substantially symmetrically disposed relative to said fiber and hemispherical lens axes, the spacing of said hemispherical lens from the laser device and to the spherical lens, and the spacing of the spherical lens to the fiber and the respective radii of the lenses being dimensioned so as to substantially focus the light from said lens device at a location for reception by said fiber, said spherical lens having a radius of about three to four times the radius of said hemispherical lens.

14. An optical coupling device comprising:

a housing;

means for securing a single mode optical fiber to said housing, said fiber having a first optical axis;

means for securing a semiconductor laser device to said housing, said laser device emitting light on a second optical axis aligned substantially with said first axis;

a hemispherical lens secured to the housing, said lens having a planar surface facing said device and an optical axis normal to the planar surface aligned with said laser device optical axis; and a spherical lens secured by said housing between the hemispherical lens and the fiber substantially symmetrically disposed relative to said fiber and hemispherical lens axes, the spacing of said hemispherical lens from the laser device and to the spherical lens, and the spacing of the spherical lens to the fiber and the respective radii of the lenses being dimensioned so as to substantially focus the light from said lens device at a location for reception by said fiber, the hemispherical lens being so dimensioned and so spaced from the spherical lens such that the coupling efficiency of the light from said laser device to said fiber is greater than 60% without the use of an anti-reflection coating on said lenses.

* * * * *